United States Patent [19]
Yoshida et al.

[11] Patent Number: 4,787,469
[45] Date of Patent: Nov. 29, 1988

[54] POWER STEERING SYSTEM

[75] Inventors: Hiroshi Yoshida, Toyokawa; Hajime Kozuka; Masao Murai, both of Okazaki, all of Japan

[73] Assignees: Mitsubishi Jidosha Kogyo Kabushiki Kaisha, Tokyo; Koyo Seiko Kabushiki Kaisha, Osaka, both of Japan

[21] Appl. No.: 888,436

[22] Filed: Jul. 23, 1986

[30] Foreign Application Priority Data

| Jul. 31, 1985 | [JP] | Japan | 60-167648 |
| Jul. 31, 1985 | [JP] | Japan | 60-116440[U] |
| Jul. 31, 1985 | [JP] | Japan | 60-116441[U] |
| Jul. 31, 1985 | [JP] | Japan | 60-116442[U] |
| Jul. 31, 1985 | [JP] | Japan | 60-116443[U] |
| Jul. 31, 1985 | [JP] | Japan | 60-116444[U] |
| Jul. 31, 1985 | [JP] | Japan | 60-116445[U] |
| Jul. 31, 1985 | [JP] | Japan | 60-116446[U] |
| Jul. 31, 1985 | [JP] | Japan | 60-116447[U] |

[51] Int. Cl.$^4$ ............................................. B62D 5/08
[52] U.S. Cl. ............................................. 180/142; 91/434
[58] Field of Search .................... 180/142, 141, 143, 132; 91/434

[56] References Cited

U.S. PATENT DOCUMENTS

| 4,293,051 | 10/1981 | Nishikawa | 180/143 |
| 4,562,896 | 1/1986 | Morishita et al. | 180/142 |
| 4,616,728 | 10/1986 | Suzuki et al. | 180/142 |

Primary Examiner—John A. Pekar
Attorney, Agent, or Firm—Wenderoth, Lind & Ponack

[57] ABSTRACT

A power steering system including an input shaft coupled to a steering wheel, a torsion bar for transmitting rotation of the input shaft to an output shaft, a power cylinder coupled to the output shaft, an oil path switching valve for switching oil paths to the power cylinder in accordance with the difference of turning angle between the input shaft and the output shaft, a high pressure oil path for supplying working oil delivered from an oil pump to the power cylinder via the oil path switching valve, a low pressure oil path for returning the working oil from the power cylinder to an oil tank via the oil path switching valve, a reaction piston for exerting a restraining force between the input shaft and the output shaft to limit the difference of turning angle therebetween, a control oil path extending from the midway of the high pressure oil path to the reaction piston, a pressure control valve for controlling oil pressure in the control oil path extending to the reaction piston to a level not higher than a predetermined highest pressure, a return side orifice for communicating the control oil path between the pressure control valve and the reaction piston with the low pressure oil path, and a solenoid for actuating the pressure control valve by means of its plunger for generating an axial force which varies in accordance with a car speed and takes substantially a certain strength at every given car speed.

10 Claims, 14 Drawing Sheets

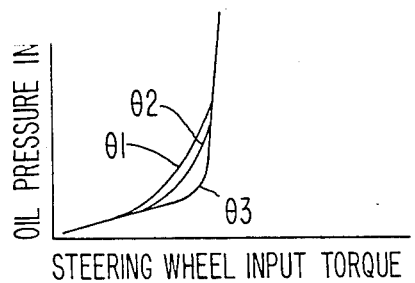
FIG. 16
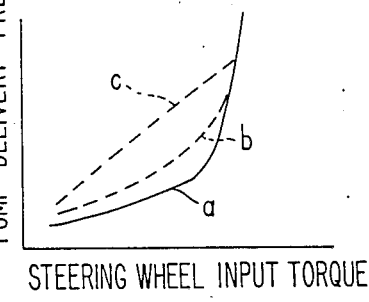
FIG. 17
FIG. 18

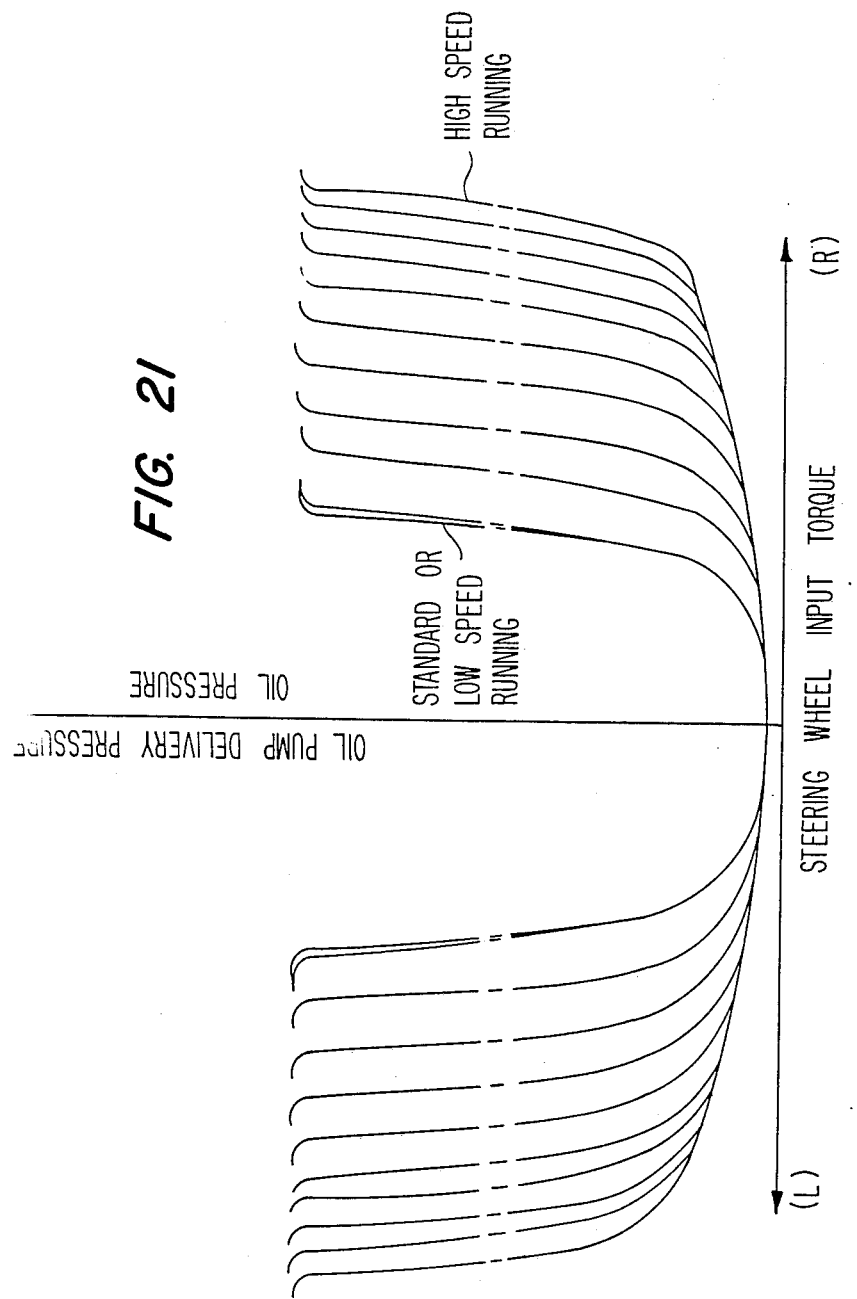

4,787,469

POWER STEERING SYSTEM

BACKGROUND OF THE INVENTION

1. Field of the Invention

This invention relates to a power steering system of the automobile.

2. Description of the Prior Art

One known type of power steering system of the automobile comprises an input shaft coupled to a steering wheel, a torsion bar for transmitting rotation of the input shaft to an output shaft, a power cylinder coupled to the output shaft, an oil path switching valve for switching oil paths to the power cylinder in accordance with the difference of turning angle between the input shaft and the output shaft, a high pressure oil path for supplying working oil delivered from an oil pump to the power cylinder via the oil path switching valve, a main orifice provided in the midway of the high pressure oil path, a low pressure oil path for returning the working oil from the power cylinder to an oil tank via the oil path switching valve, a reaction piston for exerting a restraining force between the input shaft and the output shaft to limit the difference of turning angle therebetween, a control oil path extending from the midway of the high pressure oil path to the reaction piston, a pressure control valve for controlling oil pressure in the control oil path extending to the reaction piston to a level not higher than a predetermined highest pressure, a pair of parallel oil paths branched from the midway of the control oil path between the pressure control valve and the reaction piston, a second orifice provided in one of the parallel oil paths, a flow rate control valve for selecting either one of the parallel oil paths to control the flow rate of the working oil flowing therethrough to a level corresponding to a car speed, a first orifice for generating in the downstream side oil path of the flow rate control valve a pilot pressure corresponding to the flow rate of the working oil, a pilot oil path for supplying the pilot pressure to the pressure control valve, a bypass path for bypassing the upstream side high pressure oil path and downstream side high pressure oil path of the main orifice and a change-over valve for blocking the bypass path only when the oil pressure on the downstream side of the pressure control valve becomes lower than a predetermined lowest pressure to increase the oil pressure in the whole control oil path (see, for example, Japanese Patent Application No. 58-86598: Laid-Open No. 59-213564).

The foregoing power steering system of the automobile must include a number of high precision components, such as the main orifice provided in the midway of the high pressure oil path, the parallel oil paths of a pair branched from the midway of the control oil path between the pressure control valve and the reaction piston, the second orifice provided in one of the parallel oil paths, the flow rate control valve for selecting either one of the parallel oil paths to control the flow rate of the working oil flowing therethrough to a level corresponding to a car speed, the bypass path for bypassing the upstream side high pressure oil path and downstream side high pressure oil path of the main orifice, and the changeover valve for blocking the bypass path only when the oil pressure on the downstream side of the pressure control valve becomes lower than a predetermined lowest pressure to increase the oil pressure in the whole control oil path, so that its manufacturing cost is increased.

Further, in this known power steering system, the pilot pressure generated on the downstream side of the flow rate control valve by means of the first orifice is led via the pilot oil path to the pressure control valve and caused to actuate the pressure control valve; thus, it is necessary to cause the working oil of a certain flow rate to flow from the oil pump to the control oil path even in the standing state. Therefore, at the time of stationary steering in a low speed engine rotating state where the working oil of high pressure is needed, a part of the working oil (of a constant flow rate as mentioned above) flowing from the oil pump to the power cylinder is consumed in a control circuit; thus, the capacity of the oil pump must be increased beyond a standard capacity by the amount of consumption. In addition, at the time of stationary steering, the working oil of high pressure flowing into the control circuit is controlled by the pressure control valve to a lowest pressure and led to the reaction piston section, thereby resulting in the defect that a sound of oil flow is generated in the control section of the pressure control valve.

SUMMARY OF THE INVENTION

It is the object of the present invention to provide a power steering system of the automobile capable of remarkably reducing the number of components which demand high precision to thereby lower its manufacturing cost, being not in need of increasing the capacity of an oil pump beyond a standard capacity, and capable of preventing a sound of oil flow from being generated in the control section of a pressure control valve at the time of stationary steering.

To achieve the foregoing object the present invention provides a power steering system of the automobile which comprises an input shaft coupled to a steering wheel, a torsion bar for transmitting rotation of the input shaft to an output shaft, a power cylinder coupled to the output shaft, an oil path switching valve for switching oil paths to the power cylinder in accordance with the difference of turning angle between the input shaft and the output shaft, a high pressure oil path for supplying working oil delivered from an oil pump to the power cylinder via the oil path switching valve, a low pressure oil path for returning the working oil from the power cylinder to an oil tank via the oil path switching valve, a reaction piston for exerting a restraining force between the input shaft and the output shaft to limit the difference of turning angle therebetween, a control oil path extending from the midway of the high pressure oil path to the reaction piston, a pressure control valve for controlling oil pressure in the control oil path extending to the reaction piston to a level not higher than a predetermined highest pressure, a return side orifice for communicating the control oil path between the pressure control valve and the reaction piston with the low pressure oil path, and a solenoid for actuating the pressure control valve by means of its plunger for generating an axial force which varies in accordance with a car speed and takes substantially a certain strength at every given car speed.

According to the present power steering system of the foregoing configuration, the oil pressure acting on the reaction piston (the steering force—oil pressure characteristic) varies in accordance with the car speed. Specifically, at the time of stationary steering and in a low speed running state, the oil pressure acting on the reaction piston is low and steering can be effected smoothly. In a middle/high speed running state, the oil pressure acting on the reaction piston is higher than that at the time of stationary steering and in a low speed running state even when the steering wheel is held in the vicinity of its neutral position, the degree of response of steering is enhanced, and a sense of stability is realized. Further, if the steering wheel is manipulated in a middle/high speed running state, the steering force is increased linearly owing to the oil pressure acting on the reaction piston, so that a feeling of stable steering is realized. In this state, even when the delivery pressure of the oil pump is further increased owing to a large demand caused by a road surface, the oil pressure acting on the reaction piston is controlled to a level not larger than a predetermined pressure, so that the steering force can not be increased more than is necessary.

BRIEF DESCRIPTION OF THE DRAWINGS

FIG. 16 is an explanatory graph of an oil pressure -input characteristic varying depending upon the angle of the chamfer provided on the control land;

FIG. 17 is an explanatory graph of the oil pressure -input characteristic varying depending upon the hole diameter of the in-port side orifice;

FIG. 18 is an explanatory chart showing the relation between the oil pressure in the upstream side control oil path and that in the downstream side control oil path of the pressure control valve;

FIG. 21 is an explanatory graph showing an input torque - oil pump delivery pressure characteristic.

DESCRIPTION OF THE PREFERRED EMBODIMENTS

Figure 1:
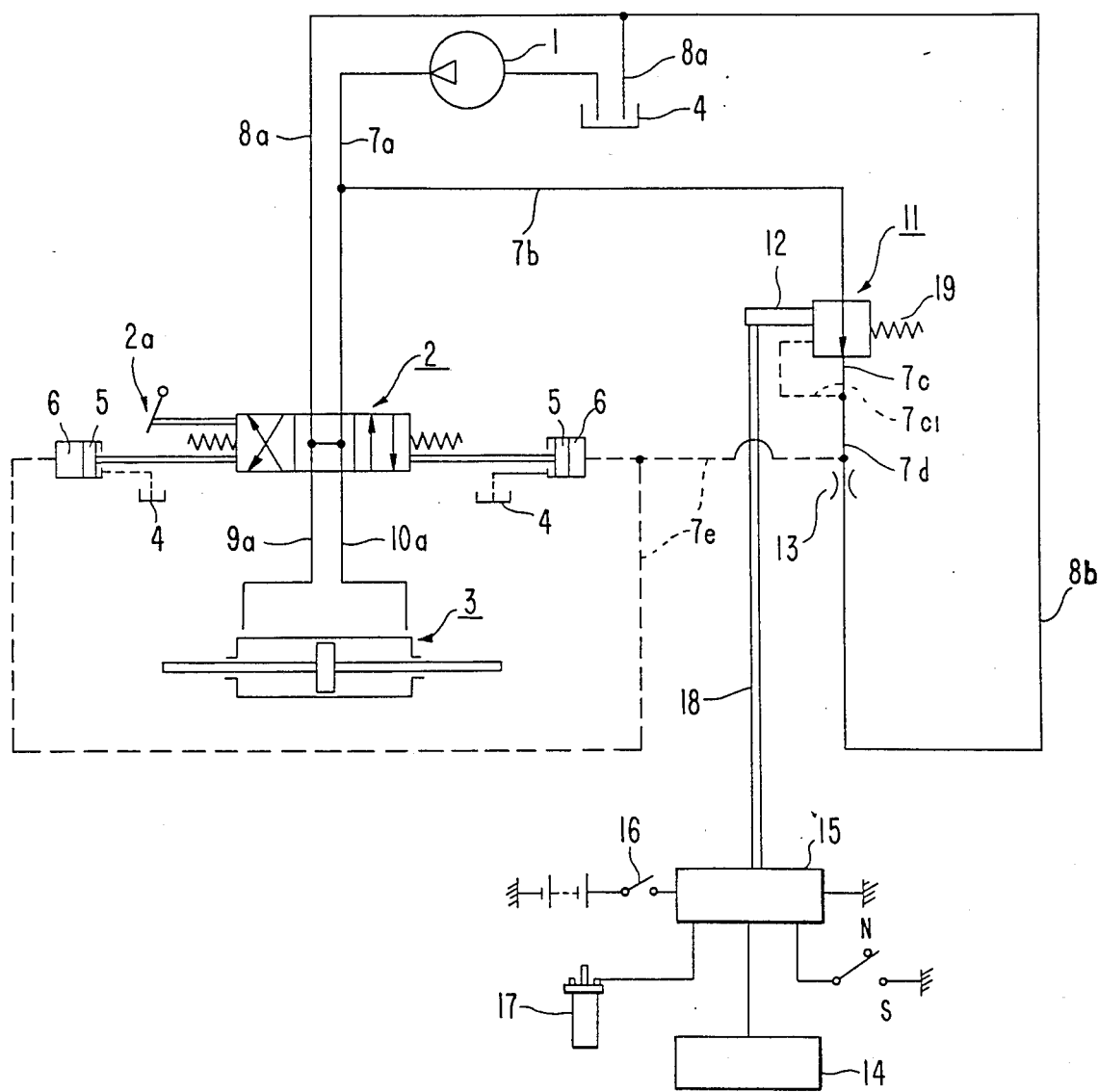
FIG. 1 is an oil hydraulic circuit diagram showing an embodiment of a power steering system according to the present invention.
Figure 2:
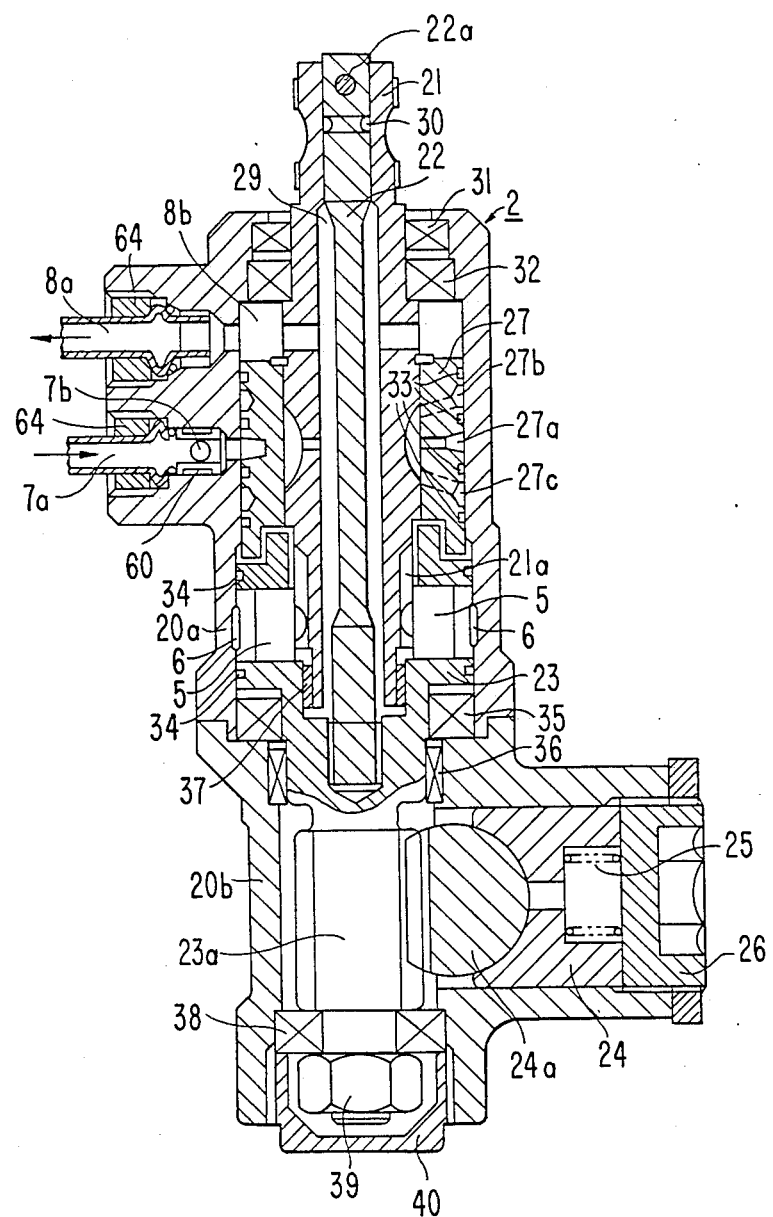
FIG. 2 is one longitudinal sectional side view of an oil path switching valve section and a pressure control valve section.

Embodiments of a power steering system according to the present invention will now be described with reference to FIGS. 1 through 15. Describing at first the outline of the power steering system with reference to FIG. 1, reference numeral 1 designates an oil pump driven by an engine (not shown), whose flow rate is constant (of the order of 7l/min) and whose delivery pressure is variable ($0Kg/cm^2$–$80Kg/cm^2$). Numeral 2 designates a four-way type oil path switching valve (a rotary valve), numeral 2a designates a steering wheel for operating the oil path switching valve 2, numeral 3 designates a steering power cylinder, numeral 4 designates an oil tank, numeral 5 designates a plurality of reaction pistons, numeral 6 designates a chamber formed on the rear side of the respective reaction pistons 5, numeral 7a designates a high pressure oil path extending from the oil pump 1 to the oil path switching valve 2, numeral 8a designates a low pressure oil path extending from the oil path switching valve 2 to the oil tank 4, numerals 9a and 10a designate oil paths extending from the oil path switching valve 2 to the power cylinder 3, and numerals 7b, 7c, 7d, and 7e designate control oil paths branched from the high pressure oil path 7a which extend up to the chamber 6 provided on the rear side of the respective reaction pistons 5. Numeral 11 designates a pressure control valve interposed between the control oil paths 7b and 7c, which controls an oil pressure in the control oil paths 7c, 7d, and 7e extending up to the chamber 6 on the rear side of the reaction pistons 5 to a level not higher than a predetermined highest pressure. Numeral 12 designates a solenoid, numeral 14 designates a car speed sensor, numeral 15 designates a control apparatus (a controller), numeral 16 designates an ignition switch, numeral 17 designates an ignition coil, and numeral 18 designates a wiring extending from the control apparatus 15 to the solenoid 12.

Functionally, the car speed sensor 14 detects a car speed, a pulse signal (corresponding to the car speed) thus obtained is sent to the control apparatus 15, and this control apparatus 15 sends a current corresponding to the pulse signal (or, corresponding to the car speed varying from a predetermined high speed running state giving a zero current value to the standing state giving a maximum current value) to an electromagnetic coil (not shown) of the solenoid 12 via the wiring 18. As a result, on a plunger of the solenoid 12 is generated an axial force which varies depending upon the car speed and takes substantially a certain value at every given car speed, this axial force is transmitted to the pressure control valve 11, and this pressure control valve 11 operates in opposition to the force of a spring 19. Numeral 13 designates a return side orifice for communicating the control oil paths 7c, 7d, and 7e provided between the pressure control valve 11 and the reaction pistons 5 with a low pressure oil path 8b to thereby generate a control oil pressure in the control oil paths 7c, 7d, and 7e situated on the upstream side of the low pressure oil path 8b, and numeral $7c_1$ designates a pilot pressure being generated in a differential pressure section 43 hereinafter described which is provided in the pressure control valve 11.

Describing in greater detail the oil path switching valve 2 with reference to FIGS. 2 through 5, its housing is divided into two parts: a valve housing 20a made of hard metal such as cast iron and a pinion housing 20b made of the same material as the above, the pinion housing 20b is attached integrally to a steering gear/linkage (not shown), and the valve housing 20a is attached detachably to the pinion housing 20b in a manner described hereinafter. Numeral 21 designates an input shaft which is controlled by the steering wheel (refer to 2a of FIG. 1), numeral 23 designates a cylinder block which is rotatably supported within the valve housing 20a by means of a needle bearing 36, and numeral 22 designates a torsion bar inserted within the input shaft 21, which is fixedly secured at its top to the upper portion of the input shfat 21 by means of a press-fit pin 22a and splinecoupled at its lower end to the inner hole of the cylinder block 23. Numeral 21a designates a plurality of longitudinal grooves (the embodiment illustrated has four longitudinal grooves) provided at equal intervals on the outer peripheral surface of the lower portion of the input shaft 21, the cylinder block 23 has a plurality of cylinders (the embodiment illustrated has four cylinders) provided extending horizontally and opposite to the respective longitudinal grooves 21a, the reaction pistons 5 are fitted in the respective cylinders, and the annular chamber 6 is formed between the cylinder block 23 and the valve housing 20a on the rear side of the respective reaction pistons 5. Numeral 23a designates a pinion formed integrally with the cylinder block 23, which projects into the pinion housing 20b in a hanging state. Numeral 24a designates a rack (an output shaft) which is meshed with the pinion 23a, numeral 24 designates a rack support positioned on the rear side of the rack 24a, numeral 26 designates a cap fixed on the pinion housing 20b, numeral 25 designates a spring interposed between the cap 26 and the rack support 24, and numeral 27 designates a valve body of the oil path switching valve 2 interposed between the valve housing 20a and the input shaft 21, which is made of hard metal such as cast iron similar to the valve housing 20a and is slidably fitted directly in the hole of the valve housing 20a. Numeral 23b designates a pin for connecting the lower end portion of the valve body 27 with the upper end portion of the cylinder block 23 in the direction of rotation, and numerals 27a, 27b, and 27c designate annular oil paths provided on the outer peripheral surface of the valve body 27.

When the steering wheel 2a is placed at a neutral position, the high pressure oil path 7a of FIG. 1 communicates with the annular oil path 27a of the valve body 27—oil paths (not shown) formed within the input shaft 21 and the valve body 27—a chamber 29—the low pressure oil path 8a, and hence working oil supplied from the oil pump 1 circulates through the high pressure oil path 7a the annular oil path 27a—the oil paths formed within the input shaft 21 and the valve body 27—the chamber 29→the low pressure oil path 8a—the oil tank 4—the oil pump 1. If the input shaft 21 is rotated in the clockwise direction (as viewed from above) relative to the valve body 27 by rotating the steering wheel 2a in the right turn direction, the high pressure oil path 7a communicates with the oil path 9a for the power cylinder 3 via the annular oil paths 27a and 27b of the valve body 27, while the oil path 10a for the power cylinder 3 communicates with the low pressure oil path 8a via the annular oil path 27c of the valve body 27 and the chamber 29, and hence the working oil supplied from the oil pump 1 is passed through the high pressure oil path 7a—the annular oil path 27a —the annular oil path 27b—the oil path 9a—the left-hand chamber of the power cylinder 3, while the working oil in the right-hand chamber of the power cylinder 3 is returned through the oil path 10a—the annular oil path 27c—the chamber 29→an oil path 47 penetrating horizontally through the input shaft 21→the low pressure oil path 8a—the oil tank 4, so that the piston rod of the power cylinder 3 moves rightward, thus, steering in the right turn direction can be effected. On the other hand, if the input shaft 21 is rotated in the counter-clockwise direction (as viewed from above) relative to the valve body 27 by rotating the steering wheel 2a in the left turn direction, the high pressure oil path 7a communicates with the oil path 10a for the power cylinder 3 via the annular oil paths 27a and 27c of the valve body 27, while the oil path 9a for the power cylinder 3 communicates with the low pressure oil path 8a via the annular oil path 27b of the valve body 27 and the chamber 29, and hence the working oil supplied from the oil pump 1 is passed through the high pressure oil path 7a—the annular path 27a—the annular oil path 27c—the oil path 10a —the right-hand chamber of the power cylinder 3, while the working oil in the left-hand chamber of the power cylinder 3 is returned through the oil path 9a—the annular oil path 27b—the chamber 29—the oil path 47 penetrating horizontally through the input shaft 21→the low pressure oil path 8a—the oil tank 4, so that the piston rod of the power cylinder 3 moves leftward, thus, steering in the left turn direction can be effected.

Figure 5:
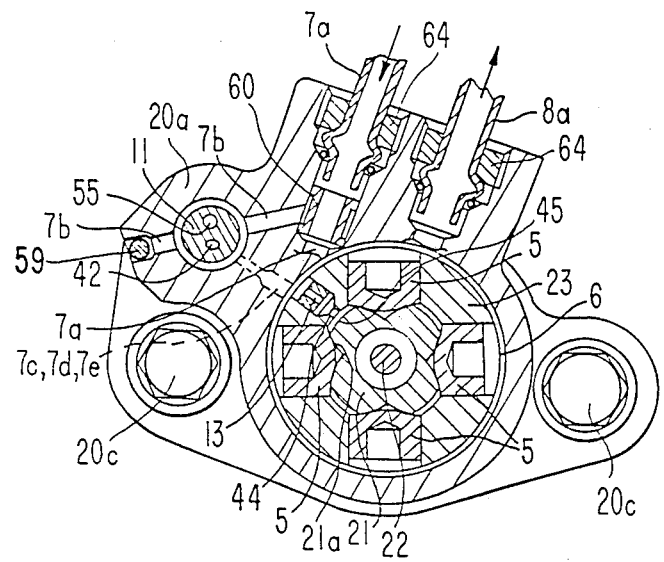
FIG. 5 is a transverse sectional plan view of the pressure control valve section and a reaction piston section.

Numeral 30 designates an O-ring, numerals 31 and 35 designate oil seals, numerals 32 and 38 designate ball bearings, numerals 33 and 34 designate seals, numeral 37 designates a bush, numeral 39 designates a nut, numeral 40 designates a cap, and numerals 20c and 20c of FIG. 5 designate bolts for detachably securing together the valve housing 20a and the pinion housing 20b. Under the condition that the valve housing 20a is separated from the pinion housing 20b the pressure control valve 11 and the like are checked in terms of an input - output characteristic. After a check on the input - output characteristic has been completed with respect to the pressure control valve 11 and the like on the side of the valve housing 20a, the valve housing 20a is set on the pinion housing 20b, the pinion 23a on the side of the valve housing 20a is made to project into the pinion housing 20b and mesh with the rack 24a on the side of the pinion housing 20b, the nut 39 is screwed, the cap 40 is tightened, and the bolts 20c are fastened, whereby the present system is completely assembled. Accordingly, even if the valve housing 20a is detached from the pinion housing 20b at the time of inspection, for example, after assembly, leakage of the working oil cannot occur because of the oil seal 31 between the input shaft 21 and the valve housing 20a, the oil seal 35 between the cylinder block 23 and the valve housing 20a, sealing O-rings 53 between a cap 49 and the valve housing 20a and between the cap 49 and a spring support member 50, and a sealing O-ring 58 between the solenoid 12 and the valve housing 20a.

Describing in greater detail the pressure control valve 11 with reference to FIGS. 2 through 5, this pressure control valve 11 is made of hard metal such as cast iron similar to the housings 20a and 20b, which is slidably fitted directly in the hole of the valve housing 20a. Although the conventional power steering system must interpose a sleeve made of hard metal between the housing and each valve body because these housing and valve bodies are made of soft metal, the present power steering system includes the pressure control valve 11 and the valve housing 20a which are made of hard metal, thus, it is not necessary to interpose a sleeve made of hard metal between them and the pressure control valve 11 can slidably be fitted directly in the hole of the valve housing 20a. This feature is equally applicable to the valve body 27 of the oil path switching valve 2. Numeral 41 designates an annular control groove of a control land provided on the outer peripheral surface in the upper portion of the pressure control valve 11, and numeral 41' designates an annular balance groove provided on the outer peripheral surface of the presure control valve 11 at a position below the control groove 41, which communicates with the control oil paths 7b and 7b provided on the same axial line on the left and right sides of the pressure control valve 11, among these control oil paths 7b the left-hand (outside) control oil path 7b being sealed at its end by means of a solid ball 59. For reference, if there were provided one control oil path 7b only on the right side, the working oil of that control oil path 7b pushes the pressure control valve 11 leftward, a frictional resistance of the pressure control valve 11 with the valve housing 20a increases, and the pressure control valve 11 becomes difficult to move smoothly. On the contrary, according to the present power steering system, the pressure control valve 11 has the control oil paths 7b and 7b on the left and right sides thereof and these control oil paths 7b and 7b are mutually communicated via the annular balance groove 41' provided on the outer peripheral surface of the pressure control valve 11, thus, the foregoing inconvenience does not occur.

Figure 3:
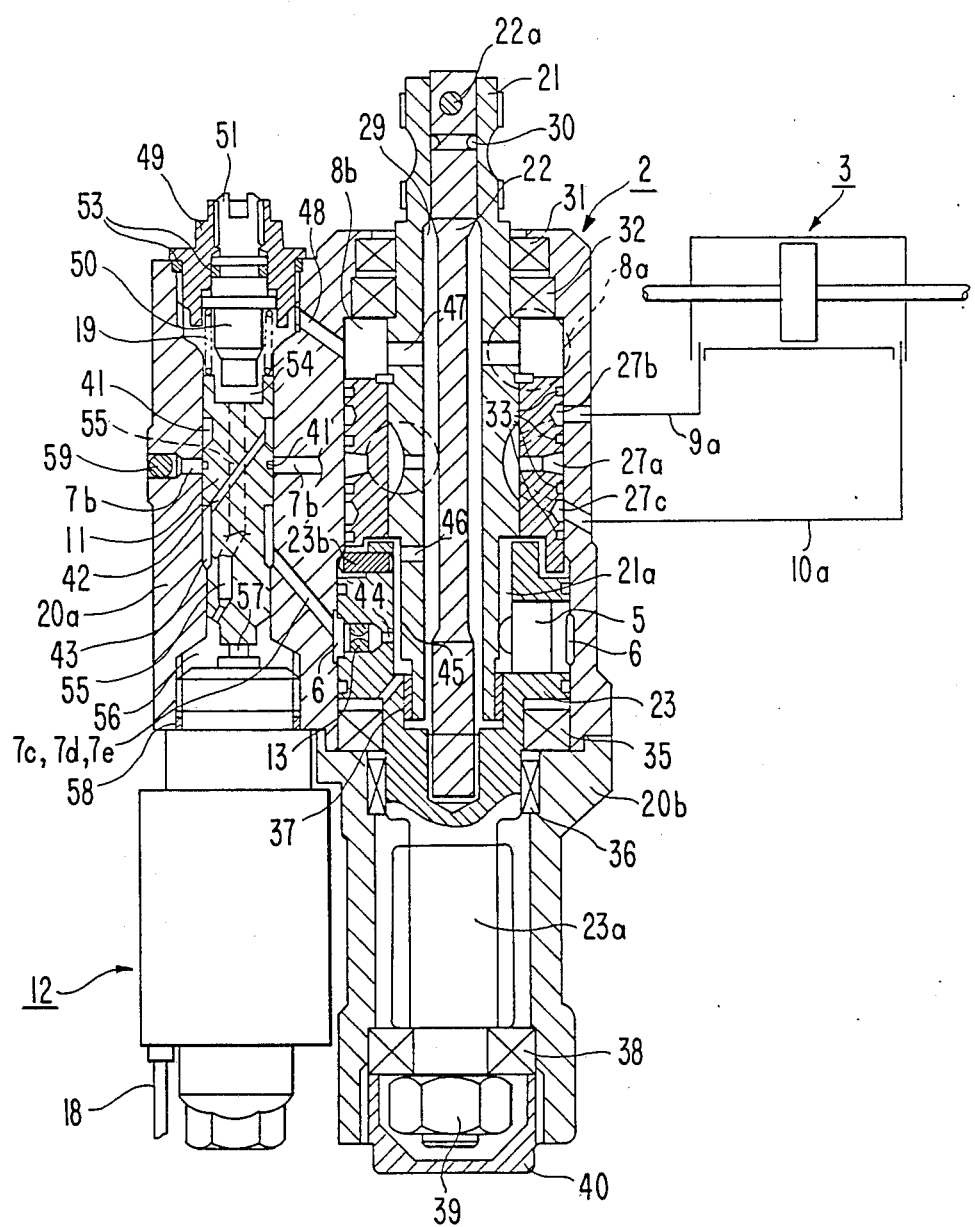
FIG. 3 is another longitudinal sectional side view of the oil path switching valve section and the pressure control valve section in the standing state.
Figure 4:
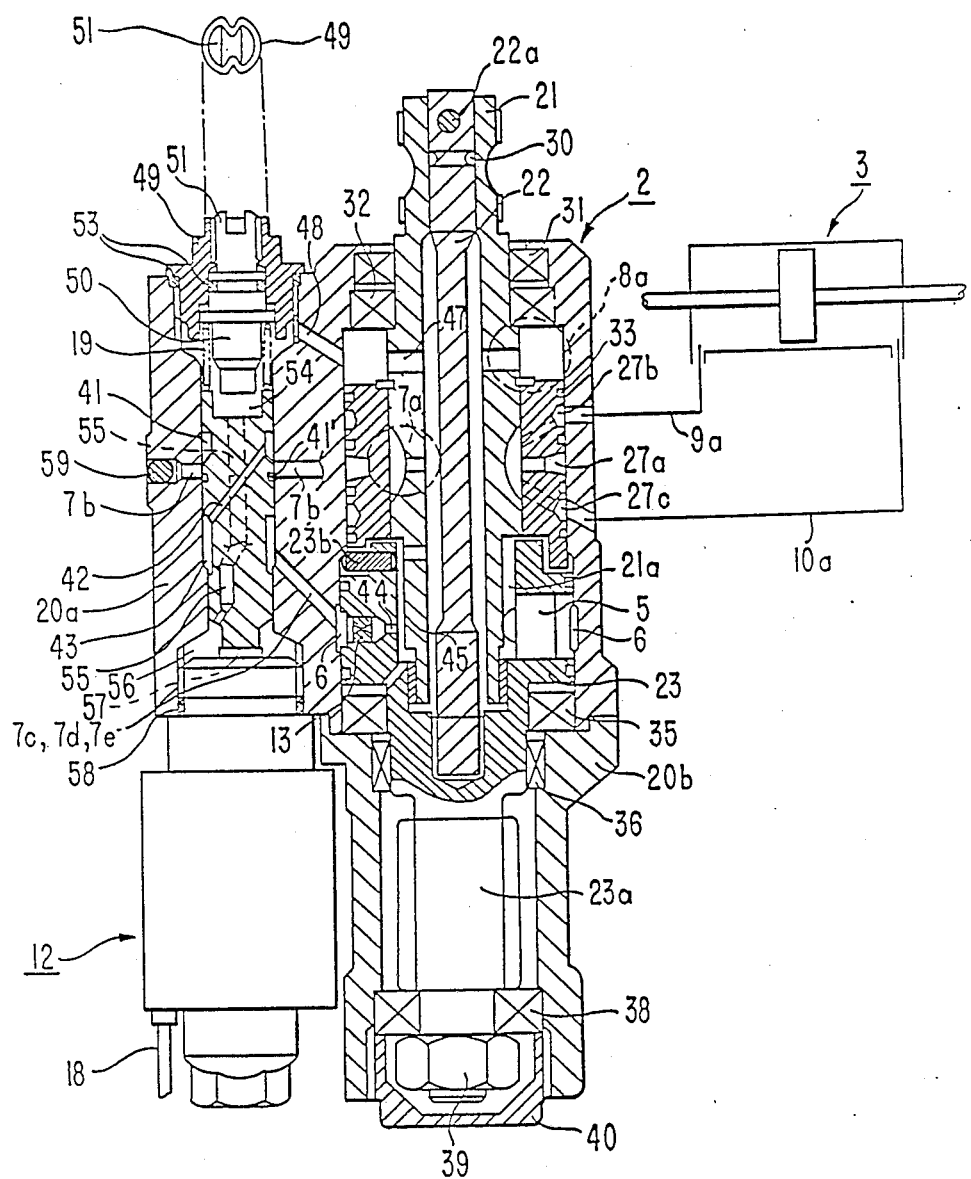
FIG. 4 is another longitudinal sectional side view of the oil path switching valve section and the pressure control valve section in the running state.

Numeral 43 designates a differential pressure section (an annular groove) provided on the outer peripheral surface in the lower portion of the pressure control valve 11, and it will be noted from a comparison between the upper pressure receiving surface and the lower pressure receiving surface of the differential pressure section 43, as shown in FIG. 4 that the upper pressure receiving surface is larger in pressure receiving area than the lower pressure receiving surface. Therefore, as a pressure oil is supplied to that section, the pressure control valve 11 is pushed upward. Numeral $7c_1$ of FIG. 1 designates an up-oriented pilot pressure being generated by the difference of pressure receiving area described above. Numeral 42 designates an oil path (an in-port side orifice) penetrating obliquely through the pressure control valve 11, which communicates the control groove 41 with the differential pressure section 43, so that this differential pressure section 43 communicates with the chamber 6 on the rear side of the reaction pistons 5 via the control oil paths 7a, 7b, and 7c shown in FIGS. 1, 3, 4, and 5. Between the inner peripheral surface of the cylinder block 23 and the outer peripheral surface in the lower portion of the input shaft 21 is formed an oil path 45 which communicates with the chamber 29 on the side of the low pressure oil path 8b via an oil path 46 penetrating horizontally through the input shaft 21.

The return side orifice 13 shown in FIG. 1 is provided within the cylinder block 23, and an oil path 44 is provided between this return side orifice 13 and the oil path 45, so that the control oil paths 7a, 7b, and 7c communicate with the low pressure oil path 8b via the return side orifice 13—the oil paths 44, 45, and 46—the chamber 29. Numeral 49 designates the cap which is screwed to a threaded portion provided in the upper portion of the valve housing 20a above the pressure control valve, 11 and numeral 50 designates a the spring support member which is fitted vertically movably in the aforementioned threaded portion, numeral 51 designates an adjusting screw screwed in cap and threaded portion, numeral 19 (see FIGS. 1, 3, 4, and 5) designates the spring for the pressure control valve, which is interposed between the spring support member 50 and the pressure control valve 11 and by which the pressure control valve 11 is urged in a downward direction. Numeral 53 designates the O-rings, numeral 54 designates a chamber formed around the spring support member 50, and numeral 48 designates an oil path provided within the valve housing 20a, so that the chamber 54 communicates with the low pressure oil path 8b via the oil path 48. Numeral 55 designates a drain oil path penetrating vertically through the pressure control valve 11, and numeral 56 designates a chamber communicating with a plunger (57) section inside the solenoid 12, so that the drain oil path 55 communicates with the chamber 56 formed below the pressure control valve 11 and the chamber 54 formed above the pressure control valve 11.

Figure 13:
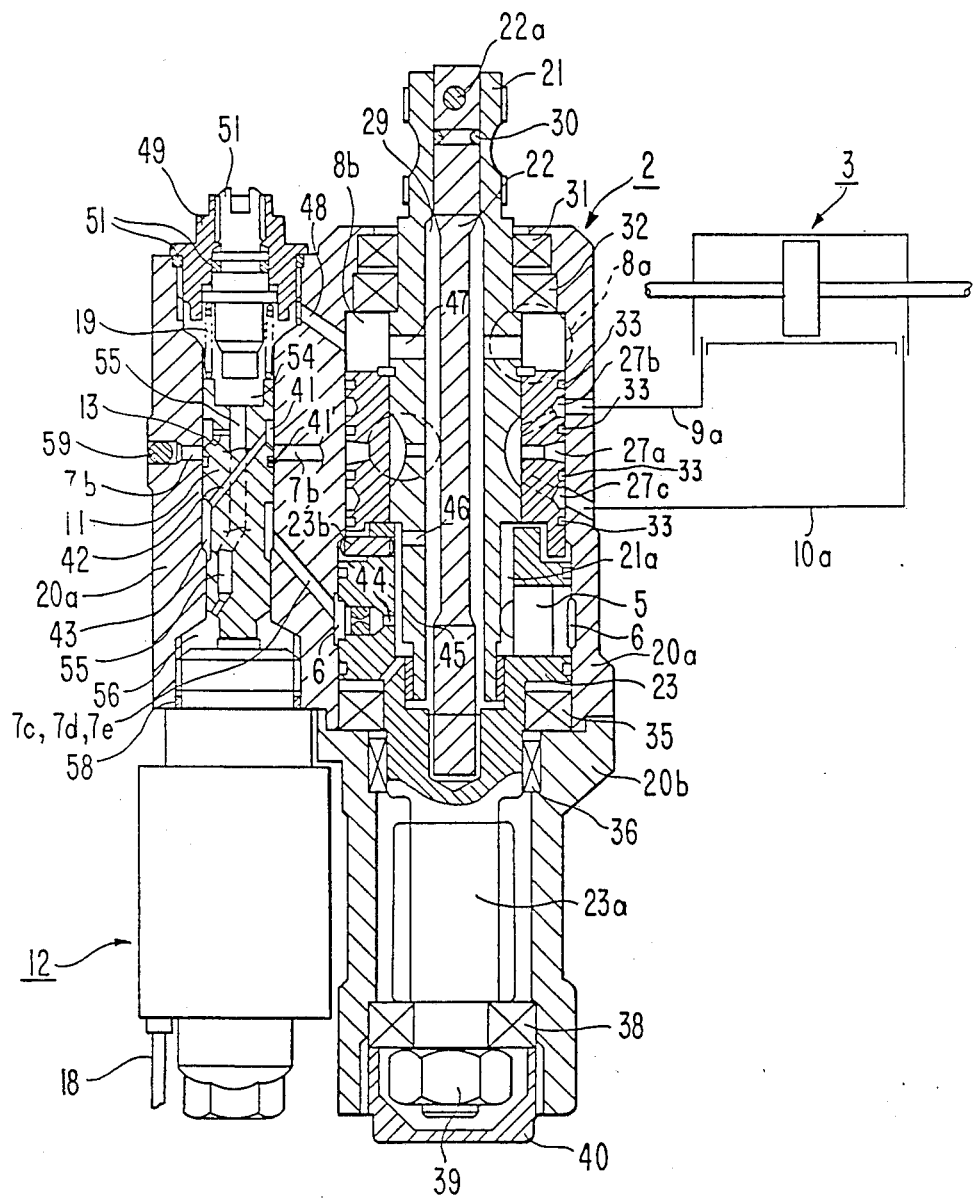
FIG. 13 is a longitudinal sectional side view showing a further example of the return side orifice.

As shown in FIG. 13, the return side orifice 13 may be provided between the control groove 41 and the drain oil path 55 (or between the differential pressure section 43 and the drain oil path 55). If the drain oil path 55 for mutually communicating the respective chambers 56 and 54 is to be provided within the valve housing 20a in lieu of in the pressure control valve 11, a vertical drain oil path must be bored extending from the upper end surface of the valve housing (20a) section between the pressure control valve 11 and the oil path switching valve 2 into the valve housing 20a, a top portion of that vertical drain oil path must be communicated with the chamber 54 via a horizontal drain oil path, a bottom portion of that vertical drain oil path must be communicated with the chamber 56 via another horizontal drain oil path, and an upper end portion of that vertical drain oil path must be sealed by a solid ball, that is, (I) a number of holes must be bored within the valve housing 20a and deburring must be effected, thereby resulting in an increase in the number of steps. Further, (II) the air mingled in the working oil accumulates in the upper portion inside that vertical drain oil path immediately below the solid ball, and this causes an inconvenience on control action.

On the contrary, according to the present power steering system, the two chambers 56 and 54 are mutually communicated via the drain oil path 55 penetrating vertically through the pressure control valve 11, thus, the foregoing inconvenience cannot occur. As shown in the upper left-hand portion of FIG. 4, a part of the upper end margin of the cap 49 is bent into the screw groove of the adjust screw 51, so that the adjust screw 51 having regulating the spring force of the spring 19 is secured to the cap 49.

Describing in greater detail the solenoid 12 with reference to FIGS. 3 and 4, the upper portion of the solenoid 12 is screwed into the valve housing 20a immediately below the pressure control valve 11. Numeral 58 designates the sealing O-ring. Within the solenoid 12 are provided an electromagnetic coil (not shown) and the plunger 57. As described hereinabove, the pulse signal (corresponding to the car speed) obtained by the car speed sensor 14 is sent to the control apparatus 15, and this control apparatus 15 in turn sends the current corresponding to the pulse signal (or, corresponding to the car speed varying from a predetermined high speed running state giving a zero current value to the standing state giving a maximum current value) to the electromagnetic coil of the solenoid 12 through the wiring 18. As a result, on the plunger 57 of the solenoid 12 is generated an axial force which varies depending upon the car speed and takes substantially a certain value at every given car speed, this axial force is transmitted to the pressure control valve 11, and this pressure control valve 11 operates in opposition to the force of the spring 19.

Figure 19:
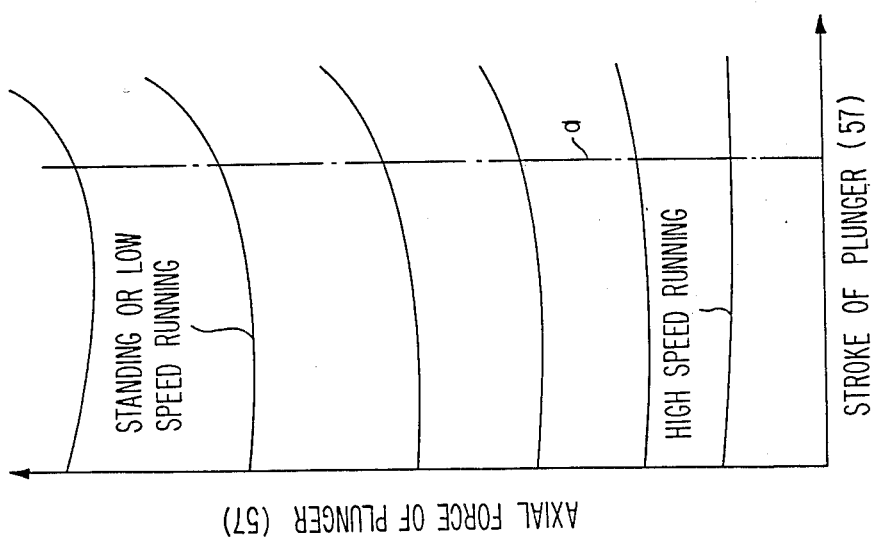
FIG. 19 is an explanatory graph showing the relation between the stroke and the axial force of a plunger of a solenoid.

FIG. 19 shows the relation between the axial force (g) and the stroke l(mm) of the plunger 57. As will be apparent from FIG. 19, on the plunger 57 of the solenoid 12 is generated the axial force whose strength varies depending upon the car speed (the current value) and takes substantially a certain value at every given car speed (at every given current value). The left-hand portion of FIG. 19 being divided by line a is a normal service range. If A represents the oil pressure being applied from the control oil path 7b via the control groove 41 and the oil path (the in-port side orifice) 42 to the differential pressure section 43, B the difference of pressure receiving area between the upper pressure receiving surface and the lower pressure receiving surface of the differential pressure section 43, C the axial force of the plunger 57 whose strength varies depending upon the car speed and takes substantially a certain value at every car speed, and D the reaction force of the spring 19, there exists the relation of $A \times B + C = D$, and hence the pressure control valve 11 is maintained in the balanced state at a position where the aforementioned relation holds.

An in-port filter 60 will now be described in greater detail with reference to FIGS. 2, and 5 through 8. The high pressure oil path 7a extends from the oil pump 1 and the control oil paths 7b through 7e are branched from the high pressure oil path 7a. Since the high pressure oil path 7a has a large inside diameter and permits a large flow rate, there arises no fear of the oil path switching valve 2 becoming inoperable even if dust and the like intrude into the section of the oil path switching valve 2. However, the control oil paths 7b through 7e are narrow in inside diameter and permit only a small flow rate, therefore, if dust and the like intrude, they accumulate in pinched portions of the control oil paths 7b through 7e, for example, in the section of the pressure control valve 11, thereby resulting in a fear that the force of the solenoid 12 cannot actuate the pressure control valve 11. For obviating the above, the in-port filter 60 is disposed in the branch portion from the high pressure oil path 7a to the control oil paths 7b through 7e to prevent dust and the like from intruding into the control oil paths 7b through 7e. The in-port filter 60 is made up of annular members 61 and 61 having a diameter substantially identical to that of the piping (the high pressure oil path 7a), a plurality of coupling segments 62 for coupling together the annular members 61, and a cylindrical net 63 attached to the inner surface each of the annular members 61 and of the coupling segments 62. The in-port filter 60 is substantially identical in diameter to the piping (the high pressure oil path 7a), and is assembled and held exchangeably, but not to come off, by fitting it in the inlet for the working oil formed in the valve housing 20a, fitting a radially outwardly flanged portion of the piping (the high pressure oil path 7a) in that inlet, and screwing a nut 64 in that inlet to secure the flange portion of the piping in that inlet. In the assembled state thus attained, the cylindrical net 63 of the in-port filter 60 is interposed between the high pressure oil path 7a and the control oil paths 7b through 7e, so that dust and the like are prevented from intruding into the control oil paths 7b through 7e. On the other hand, both axial end portions of the cylindrical net 63 are opened, so that the inside of the cylindrical net 63 forms a part of the high pressure oil path 7a. It does not matter at all whether or not the piping (the high pressure oil path 7a) is in direct contact with the in-port filter 60. When it is time to replace the in-port filter 60, it is easily replaced by removing the nut 64 and pulling out the piping (the high pressure oil path 7a).

Measures to prevent vibration of the pressure control valve 11 will now be described.

Figure 9:
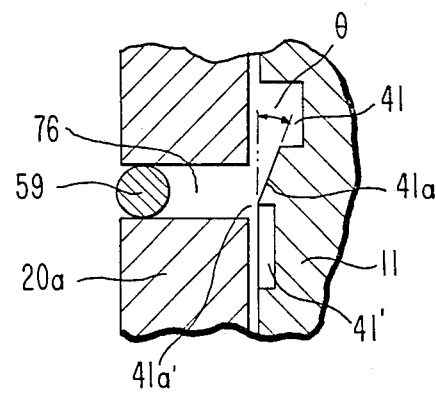
FIG. 9 is a longitudinal sectional side view of a chamfer provided on a control land.

A first measure to prevent vibration of the pressure control valve 11 will now be described as shown in FIG. 9, a chamfer 41a having an angle $\theta$ is provided on the control land between the control groove 41 and the balance groove 41'. In the case where the chamfer 41a having an outer diameter 41a' is not provided on the control land, if the pressure control valve 11 moves from the standing position of FIG. 3 to the running position of FIG. 4 to thereby cause the control oil path 7b to communicate with the control groove 41, the working oil flows abruptly from the control oil path 7b into the control groove 41 and the pressure control valve 11 begins to vibrate. However, the present power steering system has the chamfer 41a of an angle $\theta$ provided between the control groove 41 and the balance groove 41', thus, the working oil flows smoothly from the control oil path 7b into the control groove 41 and vibration of the pressure control valve 11 can be suppressed. FIG. 16 shows variations of the "steering wheel input torque"—"oil pressure in oil path 7b" characteristic, in which $\theta_1$ indicates the angle $\theta$ of the chamfer 41a being small, $\theta_2$ indicates the angle $\theta$ of the chamfer 41a being larger than $\theta_1$, and $\theta_3$ indicates the angle $\theta$ of the chamfer 41a being larger than $\theta_2$. The angle $\theta$ of the chamfer 41a is selected while taking into consideration its relation to the inside diameter of the control oil path 7b so that the degree of curvature around the inflection point of the curves shown in FIG. 16 may become moderate.

Figure 11:
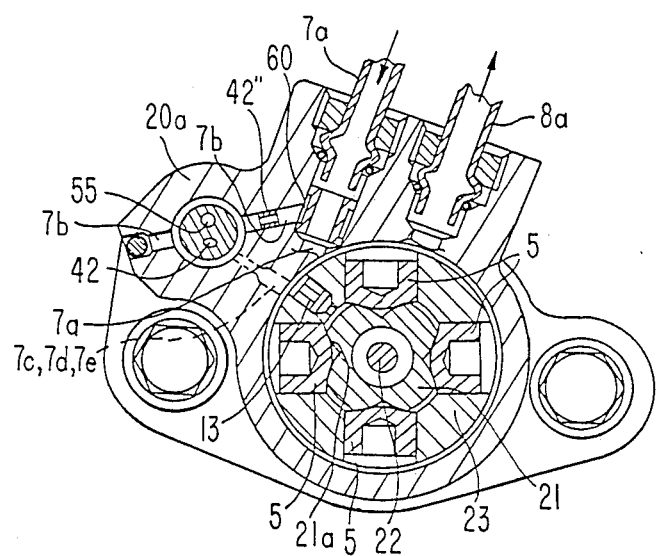
FIG. 11 is a transverse sectional plan view showing another example of the in-port side orifice.
Figure 6:
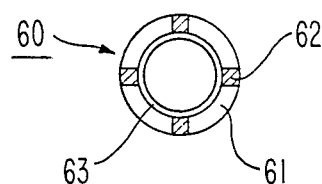
FIG. 6 is a transverse sectional plan view of an in-port filter taken along line VI—VI in FIG. 7 as viewed in the direction of arrows.
Figure 7:
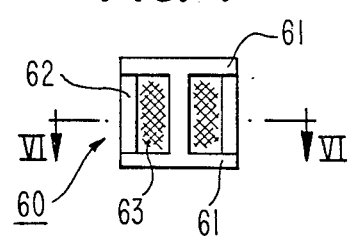
FIG. 7 is a side view of the in-port filter.
Figure 8:
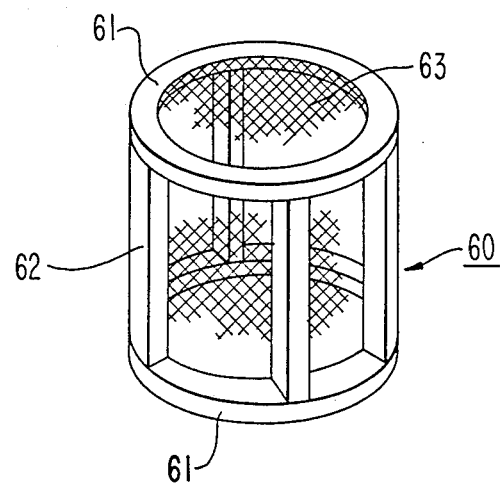
FIG. 8 is an enlarged perspective view of the in-port filter.
Figure 10:
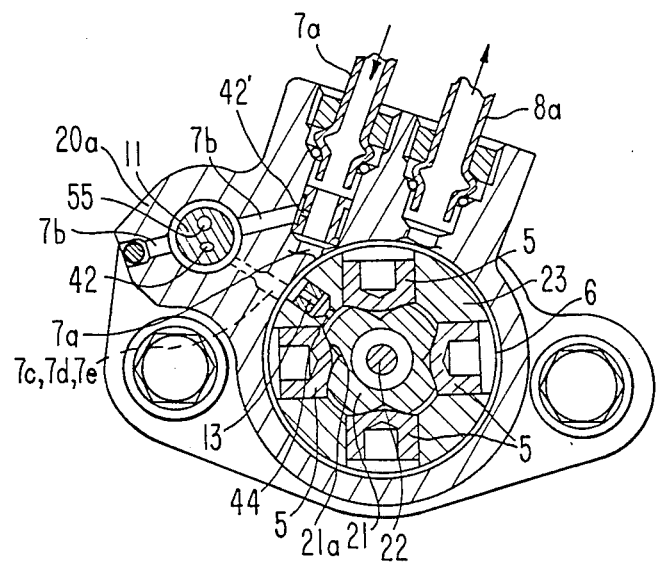
FIG. 10 is a transverse sectional plan view showing an example of an in-port side orifice.

A second measure to prevent vibration of the pressure control valve 11 will now be described wherein an in-port side orifice on the upstream side of the pressure control valve 11 is provided. As the plunger 57 of the solenoid 12 is moved up and down, the pressure control valve 11 held in the balanced state at a position where the aforementioned relation holds also moves up and down in repsonse to the movement of the plunger 57. As a result, the extent of opening of the control groove 41 with respect to the control oil path 7b changes and the oil pressure in the route consisting of the control groove 41—the oil path 42—the differential pressure section 43—the control oil path 7d changes depending upon the aforementioned extent of opening. At this time, if the pressure difference between upstream and downstream of the control groove 41 is large, the pressure control valve 11 tends to vibrate in its axial direction due to that pressure difference. The measure for the above is either (I) to provide an in-port side orifice 42' in the portion of the in-port filter 60 as shown in FIG. 10 or (II) to provide an in-port side orifice 42'' in the control oil path 7b between the in-port filter 60 and the pressure control valve 11 as shown in FIG. 11. If so configured as above, the flow rate of the working oil from the high pressure oil path 7a to the control oil path 7b is reduced and the pressure difference between upstream and downstream of the control groove 41 is lowered, so that vibration of the pressure control valve 11 can be suppressed. Curve a of FIG. 17 shows the oil pressure - input characteristic (the "pump delivery pressure in oil path 7b"—"steering wheel input torque" characteristic) in the case where the in-port side orifice is not provided; curve b shows the oil pressure input torque characteristics in the case where the in-port side orifice provided has a large inside diameter; and curve c shows the oil pressure - input torque characteristic in the case where the in-port side orifice provided has a small inside diameter. It will be apparent that the oil pressure input torque characteristic changes depending upon the inside diameter of the in-port side orifice. Especially, in the case of the in-port side orifice 42' shown in FIG. 10, parts are exchangeable and the oil pressure - input torque characteristic can arbitrarily be altered in compliance with the specifications of cars. It is also possible, as shown in FIGS. 3 and 4, to make the whole or a part of the oil path 42 between the control groove 41 and the differential pressure section 43 of the pressure control valve 11 serve as the in-port side orifice. In this case, the flow rate of the working oil flowing from the control groove 41 to the differential pressure section 43 is reduced and its sensitivity to the differential pressure section 43 becomes dull, so that vibration of the pressure control valve 11 can be suppressed. Incidentally, in the case where the in-port side orifice is incorporated as above, the oil pressure acting on the differential pressure section is reduced, so that the oil pressure acting on the reaction pistons 5 also becomes small and resultantly there can be obtained the same pump delivery pressure (the same pressure in the oil path 7a ) by a smaller torque.

Figure 12:
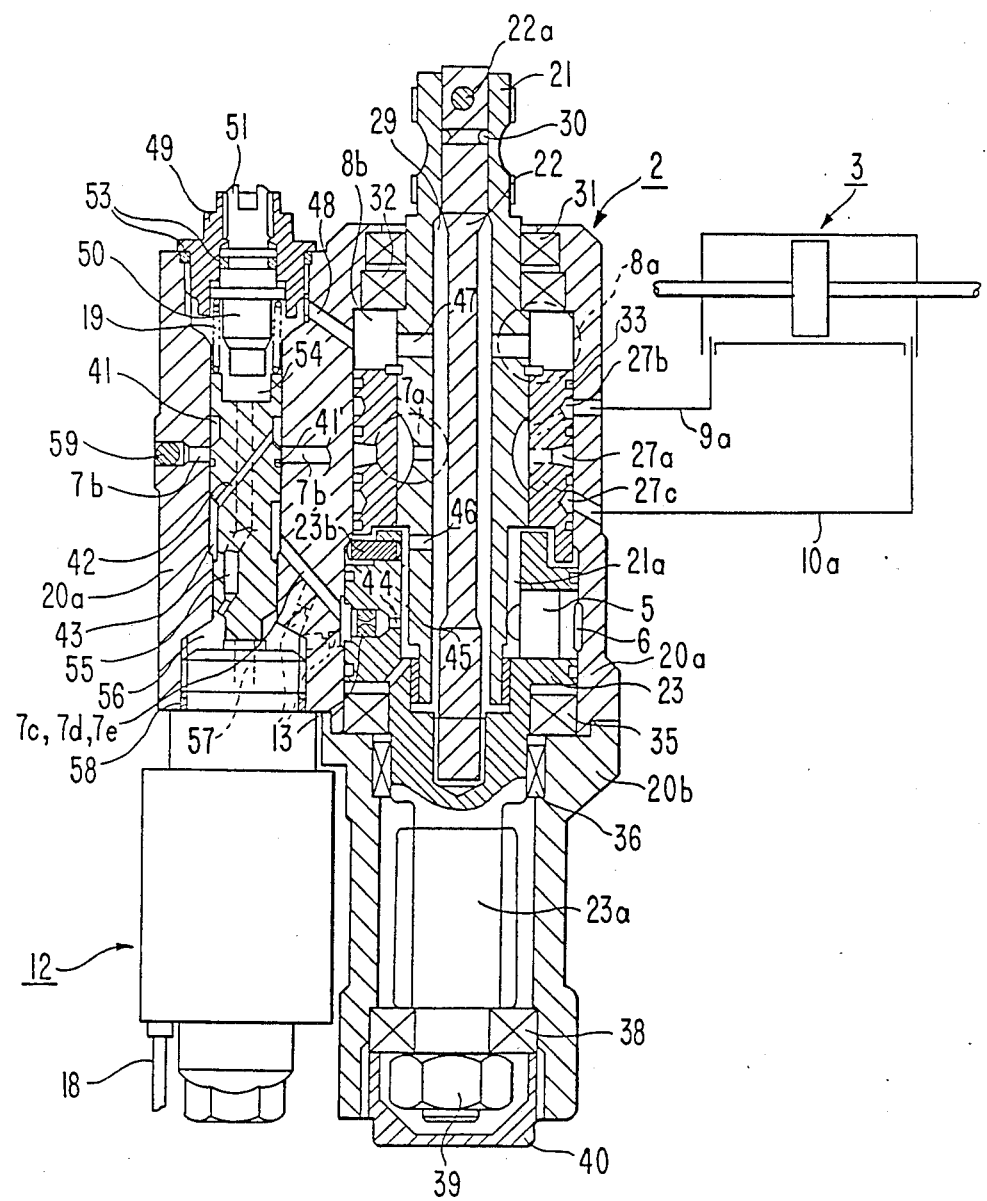
FIG. 12 is a longitudinal sectional side view showing examples of a return side orifice.

A third measure to prevent vibration of the pressure control valve 11 will now be described which is to prevent the lag in phase of the rising of the oil pressure in the control oil path 7d. As described hereinabove, as the plunger 57 of the solenoid 12 is moved up and down, the pressure control valve 11 held in the balanced state at a position where the aforementioned relation holds also moves up and down in response to the movement of the plunger 57. As a result, the extent of opening of the control groove 41 with respect to the control oil path 7b changes and the oil pressure in the route consisting of the control groove 41—the oil path 42—the differential pressure section 43—the control oil path 7d changes depending upon the aforementioned extend of opening. At this time, the closer the return side orifice 13 is to the pressure control valve 11, the greater the lag in the rising of the oil pressure in the differential pressure section 43 and the control oil path 7d. Consequently, it could be expected that when the plunger 57 of the solenoid 12 moves down, its downward movement can be properly suppressed and its balance can be preserved owing to the oil pressure in the differential pressure section 43; but, becuase of the lag in rise time of the oil pressure in the differential pressure section 43 and the control oil path 7d (that is, there appears a phase lag in pressure rising between the control groove 41 and the differential pressure section 43), the pressure control valve 11 moves down further than is needed. Therefore, the extent of opening of the control groove 41 with respect to the control oil path 7b becomes too large and the pressure in the oil path 42 and the differential pressure section 43 rises abruptly, as a result, at this moment, the pressure control valve 11 begins to move up conversely. In this way, there appears a phase lag between the movement of the pressure control valve 11 and the oil pressure in the differential pressure section 43, whereby the pressure control valve 11 vibrates in its axial direction. To prevent such vibration there is provided (I) the return side orifice 13 in the cylinder block 23 as shown in FIG. 12, or (II) a return side orifice between the chamber 6 on the rear side of the reaction pistons 5 and the chamber 56 below the pressure control valve 11 as indicated by the broken line in FIG. 12, or (III) a return side orifice between the control oil path 7d and the chamber 56 as indicated by the broken line in FIG. 12. That is, it is effective to provide the return side orifice on the downstream side of the pressure control valve 11 to thereby prevent the lag in rising of the oil pressure in the differential pressure section 43 and the control oil path 7d from appearing.

Figure 14:
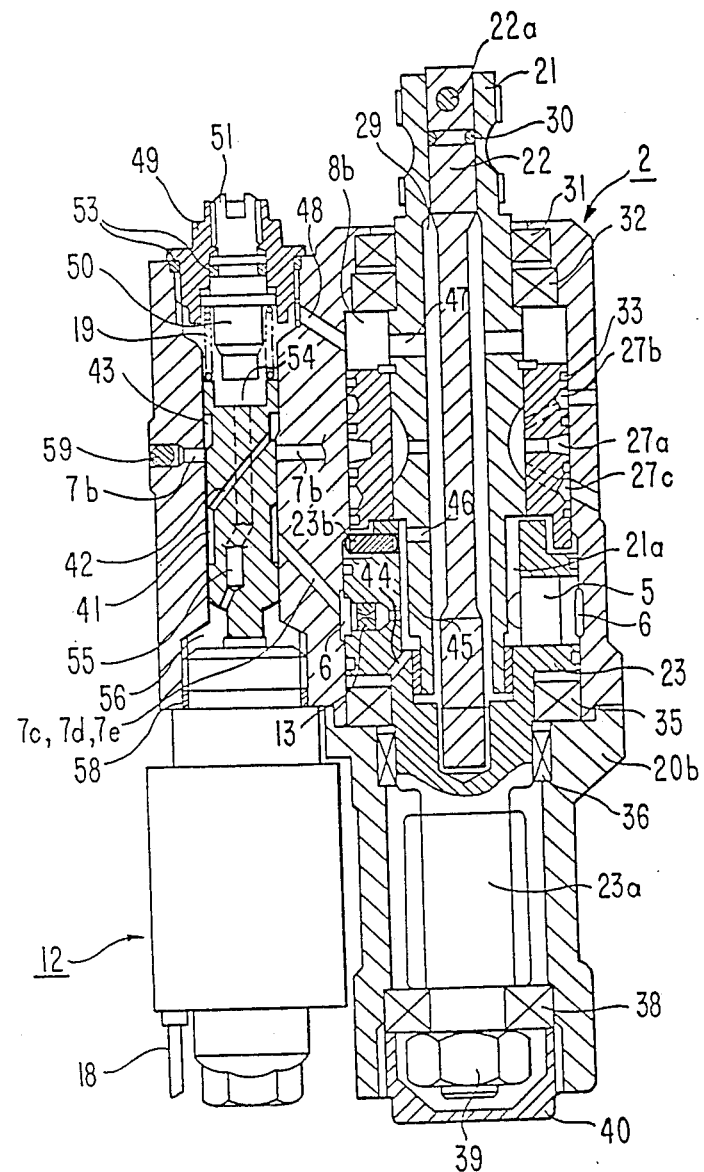
FIG. 14 is a longitudinal sectional side view showing another example of a differential pressure section of the pressure control valve.

A fourth measure to prevent vibration of the pressure control valve 11 will now be described which is to provide the differential pressure section 43 of the pressure control valve 11 at the position of the control land. As the plunger 57 of the solenoid 12 is moved up and down, the pressure control valve 11 also moves up and down in response to the up/down movement of the plunger 57. At this time, the oil pressure in the control oil path 7b is transmitted through the control groove 41—the oil path (the in-port side orifice) 42 to the differential pressure section 43, as a result, there appears a response lag in the pressure control valve 11 as described hereinabove. However, by providing the differential pressure section 43 in the portion of the control land as shown in FIG. 14, the differential pressure section 43 is close to the in-port, the response of pressure feedback is improved and its lag is prevented, consequently, vibration of the pressure control valve 11 can be suppressed.

Figure 15:
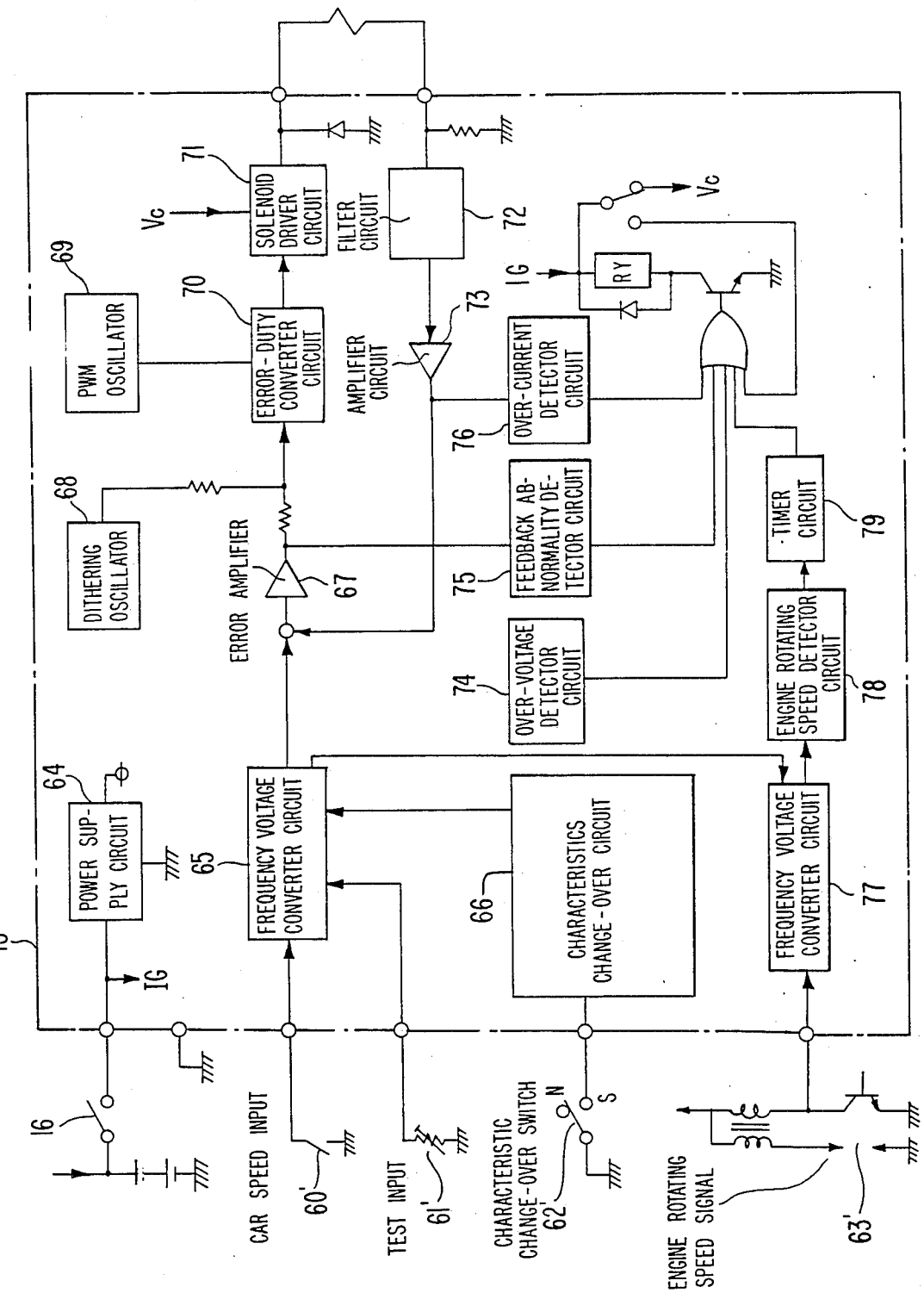
FIG. 15 is a circuit diagram of a control apparatus.
Figure 20:
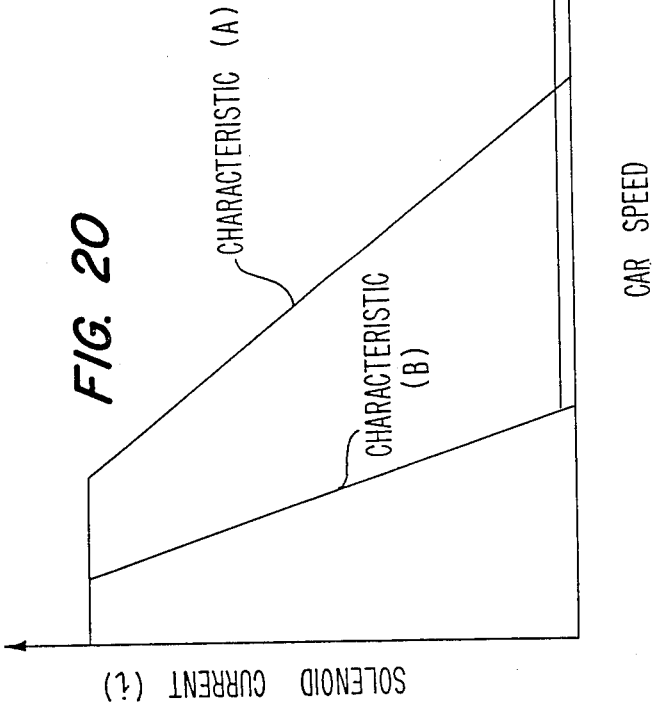
FIG. 20 is an explanatory graph showing the relation between the car speed and the solenoid current.

Describing now the control apparatus (the controller) in greater detail with reference to FIG. 15, numeral 16 designates the ignition switch, numeral 60' designates an input portion for a car speed signal given from the car speed sensor 14, and numeral 61' designates a solenoid conductivity test switch having the function of checking conductivity of the solenoid 12. Since the present power steering system is designed so as to cause a maximum current to flow through the solenoid 12 in the idling or standing state, it is possible to control the power steering system with a lightest force. However, if a diagnosis tester is used in the above state, the current flowing through the solenoid 12 can be reduced to smaller than about one half of its maximum value, whereby it is possible in the standing state to ascertain the steering characteristics at the time of middle/high speed running. The solenoid conductivity test switch 61' is provided therefor. Numeral 62' designates a characteristic change-over switch, numeral 63' designates an engine rotating speed signal detected from an ignition signal (at an ignition coil terminal) of an engine, numeral 64' designates a power supply circuit, numeral 65 designates a frequency-voltage converter circuit, and numeral 66 designates a characteristic change-over circuit which is adapted to select the solenoid current corresponding to the car speed, as shown in FIG. 20, in response to the change-over operation of the characteristic change-over switch 62. Numeral 67 designates an error amplifier, numeral 68 designates a dithering oscillator for adding a low frequency oscillation in order to reduce a mechanical hysteresis, numeral 69 designates a PWM-oscillator for adding a comparatively high frequency oscillation in order to reduce a magnetic hysteresis, numeral 70 designates an error-duty converter circuit, numeral 71 designates a solenoid driver circuit, numeral 72 designates a filter circuit, numeral 73 designates an amplifier circuit, and numeral 74 designates an over-voltage detector circuit which turns on a relay of the control apparatus 15 when an over-voltage is applied to respective portions of the power supply circuit 64 due to failure and the like of the power supply circuit 64. Numeral 75 designates a feedback-abnormality detector circuit which turns on the relay of the control apparatus 15 when abnormality appears in the solenoid current control characteristic due to failure of the electromagnetic coil of the solenoid 12 or chassis' harnesses. Numeral 76 designates an over-current detector circuit which turns on the relay of the control apparatus 15 when the current into the solenoid 12 increases abnormally due to failure and the like of the solenoid driver circuit 71. Numeral 77 designates a frequency-voltage converter circuit, numeral 78 designates an engine rotating speed detector circuit, and numeral 79 designates a timer circuit which keeps the relay ON until the ignition switch 16 is turned off when the car speed signal cannot be received for a given time interval or more in a high speed running state, this being judged as though an abnormality has occurred with the car speed sensor 14 or harnesses. The control apparatus 15 made up of the foregoing elements has (I) the car speed responsive function of reducing the current flowing through the solenoid 12 in inverse proportion to the car speed on the basis of the pulse signal given from the car speed sensor 14, (II) the fail-safe function of turning on the relay within the control apparatus 15 to thereby cut off an output current to the solenoid 12 even if failure occurs in an electric network and keeping the thus attained state until the ignition switch 16 is turned off (or switched to an ACC or LOC position), (III) the function of checking conductivity of the solenoid 12, and (VI) the function of selecting the solenoid current characteristic corresponding to the car speed. Incidentally, since the steering characteristic is switched to one relating to a middle/high speed running state when the fail-safe function (II) is activated, the car can be driven safely as in the normal state.

The operation of the present power steering system will now be described in greater detail. As the steering wheel 2a is rotated from its neutral position in the right turn or left turn direction and thereby the relative turning angle of the input shaft 21 with respect to the valve body 27 increases, the output oil pressure Pp of the oil path switching valve 2 (the delivery pressure of the oil pump 1) rises while tracing a quadratic curve as shown in FIG. 21. The influence of the delivery pressure Pp of the oil pump 1 appears directly in the high pressure oil path 7a and/or the control oil path 7b, thus, the oil pressure of the control oil path 7b rises in a similar manner. Here, if the car is in the standing state and hence no pulse signal is supplied from the car speed sensor 14, the control apparatus 15 sends a predetermined maximum current to the solenoid 12 to thereby move the plunger 57 up to the position shown in FIG. 3. At the same time, the pressure control valve 11 also moves up to the position shown in FIG. 3 in response to the upward movement of the plunger 57 and in opposition to the force of the spring 19, and the communication between the control oil paths 7b and 7c is blocked by means of the pressure control valve 11. Accordingly, the oil pressure in the control oil paths 7c, 7d, and 7e on the downstream side farther than the pressure control valve 11 is lowest and the oil pressure in the chamber 6 on the rear side of the reaction pistons 5 becomes lowest too. This condition is preserved hereafter, that is, even if the steering wheel 2a is rotated further in the right turn or left turn direction and the oil pressure Pp in the high pressure oil path 7a and/or the control oil path 7b increases further, the pressure control valve 11 keeps the oil pressure in the control oil paths 7c, 7d, and 7e in the lowest state. The pressure relation at this time between the control oil path 7b and the control oil path 7d is represented by the "standing" state line shown in FIG. 18. Therefore, even if the aforementioned relative turning angle is made large to get a large output oil pressure Pp, the torque T of the steering wheel 2a determined by the oil pressure in the chamber 6 on the rear side of the reaction pistons 5 and the torsion angle of the torsion bar 22 does not become large.

When the car is brought into a low speed running state, the control apparatus 15 receives the pulse signal from the car speed sensor 14 and sends a current corresponding to the "current" car speed to the solenoid 12 to thereby move down the plunger 57 by an extent corresponding to that current value. As a result, the pressure control valve 11 is moved down by means of the spring 19 by the extent of downward movement of the plunger 57 as shown in FIG. 4, a part of the control groove 41 comes into communication with the control oil path 7b, and there appears a pressure in the control groove 41, oil path 42, control oil paths 7c, 7d, and 7e, and chamber 6 on the rear side of the reaction pistons 5, thus, the oil pressure in the chamber 6 becomes higher than that in the standing state. That is, as the steering wheel 2a is rotated in the right turn or left turn direction in a low speed running state, the oil pressure Pp in the high pressure oil path 7a and/or the control oil path 7b rises, but, the oil pressure acting on the chamber 6 on the rear side of the reaction pistons 5 and on the control oil paths 7c, 7d, and 7e is controlled to a certain level, depending upon the extent of lowering of the axial output of the plunger 57, which is higher than that in the standing state. The pressure relation at this time between the control oil path 7b and the control oil path 7d is represented by the "low speed running" state line shown in FIG. 18. Therefore, when the aforementioned relative turning angle is made large to get a large output oil pressure Pp, the torque T of the steering wheel 2a becomes larger than that in the standing state, but not larger than that attained in a high speed running state hereinafter described. At this time, the working oil supplied into the chamber 6 passes through the return side orifice 13—the oil path 45—the oil path 46—the chamber 29—the low pressure oil path 8b—the low pressure oil path 8a and returns to the oil tank 4, and then is pumped again by means of the oil pump 1.

When the car is brought into a certain high speed running state, the control apparatus 15 receives the pulse signal from the car speed sensor 14 and cut off the current to the solenoid 12 to thereby allow the plunger 57 to move down to the lower limit position. As a result, the pressure control valve 11 is moved down by the extent of lowering of the plunger 57 by means of the spring 19, and substantially the whole part of the control groove 41 comes into communication with the control oil path 7b. In this high speed running state, as the steering wheel 2a is rotated in the right turn or left turn direction, the oil pressure Pp in the high pressure oil path 7a and/or the control oil path 7b rises. However, since the axial force of the plunger 57 becomes substantially zero, the oil pressure acting on the control oil paths 7c, 7d, and 7e and on the chamber 6 on the rear side of the reaction pistons 5 is controlled to a certain level higher than that attained in the low speed running state. The pressure relation at this time between the control oil path 7b and the control oil path 7d is represented by the "high speed running" state line shown in FIG. 18. Therefore, when the aforementioned relative turning angle is made large to get a large output oil pressure Pp, the torque T of the steering wheel 2a becomes larger than that attained in the low speed running state. At this time, also, the working oil supplied into the chamber 6 passes through the orifice 13—the oil path 45—the oil path 46—the chamber 29—the low pressure oil path 8b—the low pressure oil path 8a and returns to the oil tank 4, and then is pumped again by means of the oil pump 1.

The curves shown in FIG. 21 represent variations of the relation between the input torque of the steering wheel 2a and the delivery pressure of the oil pump, corresponding to discrete car speeds ranging from the standing state to the high speed running state.

According to the main feature of the present invention, the present power steering system comprises the input shaft coupled to the steering wheel, the torsion bar for transmitting rotation of the input shaft to the output shaft, the power cylinder coupled to the output shaft, the oil path switching valve for switching oil paths to the power cylinder in accordance with the difference of turning angle between the input shaft and the output shaft, the high pressure oil path for supplying the working oil delivered from the oil pump to the power cylinder via the oil path switching valve, the low pressure oil path for returning the working oil from the power cylinder to the oil tank via the oil path switching valve, the reaction piston for exerting the restraining force between the input shaft and the output shaft to limit the difference of turning angle therebetween, the control oil path extending from the midway of the high pressure oil path to the reaction piston, the pressure control valve for controlling the oil pressure in the control oil path extending to the reaction piston to a level not higher than a predetermined highest pressure, the return side orifice for communicating the control oil path between the pressure control valve and the reaction piston with the low pressure oil path, and the solenoid for actuating the pressure control valve by means of its plunger for generating the axial force which varies in accordance with the car speed and takes substantially a certain strength at every given car speed, whereby the oil pressure acting on the reaction piston (the steering force - oil pressure characteristics) varies in accordance with the car speed. Specifically, at the time of stationary steering and in the low speed running state the oil pressure acting on the reaction piston is low and steering can be effected smoothly. In the middle/high speed running state, the oil pressure acting on the reaction piston is higher than that attained at the time of stationary steering and in the low speed running state even when the steering wheel is held in the vicinity of its neutral position, a response of steering is enhanced, and a sense of stability is realized. Further, if the steering wheel is manipulated in the middle/high speed running state, the steering force is increased linearly owing to the oil pressure acting on the reaction piston, so that a feeling of stable steering is realized. Furthermore, in this state, even when the delivery pressure of the oil pump is further increased due to a large demand caused by a road surface, the oil pressure acting on the reaction piston is controlled to a level not higher than a predetermined pressure, so that the steering force cannot be increased more than is necessary. In addition, according to the present invention, the foregoing control action is performed by the pressure control valve and the solenoid, thus, the number of components which require high precision can be reduced as compared with the conventional power steering system and the manufacturing cost can be lowered. At the time of stationary steering in a low speed engine rotating state where high pressure working oil is required, the working oil need not be caused to flow into the control oil path, thus, the capacity of the oil pump is not required to be increased more than a standard capacity and hence the manufacturing cost can be lowered further in this respect. Moreover, at the time of stationary steering in a low speed engine rotating state where high pressure working oil is required as mentioned above, the working oil need not be caused to flow into the control oil path, thus, there is the effect that a sound of oil flow which is generated in the case of the conventional power steering system can be prevented.

According to the second feature of the present invention, the present power steering system of the foregoing main configuration further includes the spring for urging the pressure control valve in the direction of increasing the oil pressure in the control oil path, and the control apparatus for supplying a current to the solenoid which decreases with an increase in the car speed, whereby the oil pressure in the control oil path is increased with an increase in the car speed and decreased with a decrease in the car speed. Thus, there is the effect that the oil pressure acting on the reaction piston can be varied smoothly in accordance with the car speed.

According to the third feature of the present invention, the present power steering system of the foregoing main configuration is characterized in that the pressure control valve 11 has the chambers 54 and 56 formed within its valve housing 20a at positions confronting its opposite ends, one chamber 54 of the chambers 54 and 56 is communicated with the low pressure oil path 8b, the chambers 54 and 56 are mutually communicated via the drain oil path 55 provided within the pressure control valve 11, the pressure control valve 11 has the annular control groove 41 and differential pressure section 43 provided on its outer peripheral surface, and the control groove 41 and the differential pressure section 43 are mutually communicated via the oil path 42 provided within the pressure control valve 11. Therefore, it is not necessary to provide a drain oil path for mutually communicating the chambers facing either end of the pressure control valve and an oil path for mutually communicating the control groove and the differential pressure section within the valve housing, and by sealing opening portions exposed on the outer peripheral surface of the valve housing by the use of solid balls, thus, the number of steps can be reduced. Further, since these oil paths are provided within the pressure control valve 11 without forming any room for air mingled in the working oil, an inconvenience over the control action that would arise if such air accumulates in portions of the oil paths immediately below such blank balls can effectively be solved.

According to the fourth feature of the present invention, the present power steering system of the foregoing main configuration is characterized in that the pressure control valve 11 has the chamfer 41a provided on the whole periphery of its control land for causing the working oil to flow smoothly from the in-port (7b) side of the control oil paths 7b, 7c, 7d, and 7e into the control groove 41 provided on the outer peripheral surface of the pressure control valve 11, whereby the working oil flows smoothly from the in-port (7b) side of the control oil paths 7b, 7c, 7d, and 7e into the control groove 41 provided on the outer peripheral surface of the pressure control valve 11. Therefore, the pressure control valve 11 cannot vibrate in its axial direction and intended control action can smoothly be performed.

According to the fifth feature of the present invention, the present power steering system of the foregoing main configuration is characterized in that the in-port side orifice 42' or 42" is provided either in the inlet or in the vicinity thereof of the control oil paths 7b, 7c, and 7d branched from the high pressure oil path 7a, whereby the pressure difference between upstream and downstream of the control land of the pressure control valve 11 is reduced. Therefore, the pressure control valve 11 cannot vibrate in its axial direction and intended control action can smoothly be performed.

According to the sixth feature of the present invention, the present power steering system of the foregoing main configuration is characterized in that the return side orifice 13 is provided in either the cylinder section 23 of the reaction pistons or the valve housing 20a on the downstream side farther than the pressure control valve 11, whereby the lag in rise of the oil pressure in the differential pressure section 43 and the control oil paths 7c, 7d, and 7e is prevented. Therefore, the pressure control valve cannot vibrate in its axial direction and intended control action can smoothly be performed. Specifically, it could be expected that when the pressure control valve 11 moves down, its downward movement is suppressed by means of the oil pressure in the differential pressure section 43 and hence the balanced state is brought about. However, the closer the return side orifice 13 is to the pressure control valve 11, the greater is the lag in the rise of the oil pressure in the differential pressure section 43 and the control oil paths 7c, 7d, and 7e of the pressure control valve 11, and as a result, the extent of opening of the control groove 41 with respect to the inlet side control oil path 7b of the pressure control valve 11 becomes too large, the pressure inside the differential pressure section 43 rises abruptly, and the pressure control valve 11 then begins to move up conversely. In this way, if there appears a phase lag between the movement of the pressure control valve 11 and the rising of the oil pressure in the differential pressure section 43, the pressure control valve 11 vibrates in its axial direction. In order to prevent such vibration it is better to provide the return side orifice 13 on the downstream side of and remote from the pressure control valve 11 is possible. According to the present invention, the return side orifice 13 is provided in either the cylinder section 23 of the reaction pistons or the valve housing 20a on the downstream side farther than the pressure control valve 11, whereby the lag in rising of the oil pressure in the differential pressure section 43 and the control oil paths 7c, 7d, and 7e is prevented, the pressure control valve cannot vibrate in its axial direction, and hence intended control action can smoothly be performed.

According to the seventh feature of the present invention, the present power steering system of the foregoing main configuration is characterized in that the differential pressure section 43 is provided on the downstream side of and close to the control land of the pressure control valve 11 (see FIG. 14), whereby vibration of the pressure control valve 11 is prevented. That is, if the control groove on the outer peripheral surface of the pressure control valve 11 is provided close to the control land, the differential pressure section of the pressure control valve is provided on the downstream side of the control groove, and the control groove and the differential pressure section are mutually communicated via the in-port side orifice, the pressure control valve involves a response lag. According to the present invention, however, the differential pressure section 43 is provided on the downstream side of and close to the control land of the pressure control valve 11 so that it becomes close to the in-port, whereby the response of pressure feedback is improved, a response lag is prevented, and vibration of the pressure control valve 11 is suppressed.

According to the eighth feature of the present invention, the present power steering system of the foregoing main configuration is characterized in that the in-port filter 60 is provided in the inlet of the control oil paths 7b, 7c, and 7d branched from the high pressure oil path 7a, whereby dust is caught at the inlet of the control oil paths 7b, 7c, 7d, and 7e, does not accumulate along the length of the control oil paths 7b, 7c, 7d, and 7e or around the pressure control valve 11, and causes no obstacle to the operation of the pressure control valve 11.

According to the ninth feature of the present invention, the present power steering system of the foregoing main configuration is characterized in that the pressure control valve 11 and the valve housing 20a for supporting the former are made of abrasion resisting material, and the pressure control valve 11 is slidably fitted in the hole of the valve housing 20a, whereby a sleeve is unnecessary which was interposed between the pressure control valve 11 and the valve housing 20a hitherto. That is, according to the conventional power steering system wherein the housing and the valve body of each valve are made of soft metal, a sleeve made of soft metal must be interposed between the housing and the valve bodies. According to the present invention, however, the pressure control valve 11 and the valve body 20a for supporting the former are made of abrasion resisting material such as hard metal and the pressure control valve 11 is slidably fitted in the hole of the valve housing 20a, thus, it is not necessary to interpose a sleeve between the pressure control valve 11 and the valve housing 20a. Therefore, the number of components can be further reduced and the manufacturing cost can also be lowered. Further, because such a sleeve is omitted, assembly of the pressure control valve 11 in the valve housing 20a can easily be achieved.

According to the tenth feature of the present invention, the present power steering system of the foregoing main configuration is characterized in that the input shaft 21, the reaction pistons 5, the pressure control valve 11, and the solenoid 12 are provided in the valve housing 20a, the rack (the output shaft) 24a is provided in the pinion housing 20b, and the valved housing 20a and the pinion housing 20b are assembled together detachably. Therefore, a check of the input - output characteristic with respect to the pressure control valve 11 and the like is effected when the valve housing 20a is separated from the pinion housing 20b, and when such a check has been completed, the valve housing 20a is set on the pinion housing 20b on the side of the steering gear/linkage and both components are secured together. Even after assembly it is possible to disassemble the system for examination and to perform a check of the input output characteristic, whereby a proportion of defective unit can be decreased. Further, if a part of the components subsequently become damaged, the housing can be exchanged unit by unit, without the need of exchanging the entire system.

Having thus described the present invention with reference it is not necessary to interpose a sleeve to the preferred embodiments, it will be understood by those skilled in the art that the present invention is not limited to only such embodiments but rather, various changes and modifications may be made thereto without departing from the scope of the appended claims.

What is claimed is:

1. A power steering system comprising
   an input shaft coupled to a steering wheel,
   a torsion bar for transmitting rotation of said input shaft to an output shaft,
   a power cylinder coupled to said output shaft,
   an oil path switching valve for switching oil paths to said power cylinder in accordance with the difference of turning angle between said input shaft and said output shaft,
   a high pressure oil path for supplying working oil delivered from an oil pump to said power cylinder via said oil path switching valve,
   a low pressure oil path for returning the working oil from said power cylinder to an oil tank via said oil path switching valve,
   a reaction piston for exerting a restraining force between said intput shaft and said output shaft to limit the difference of turning angle therebetween,
   a control oil path extending from the midway of said high pressure oil path to said reaction piston,
   a pressure control valve for controlling oil pressure in said control oil path extending to said reaction piston to a level not higher than a predetermined highest pressure,
   a spring for energizing said pressure control valve in the direction of increasing the control oil pressure,
   a return side orifice for communicating said control oil path between said pressure control valve and said reaction piston with said low pressure oil path,
   a solenoid of which the plunger energizes said pressure control valve in the direction of decreasing the control oil pressure, while the axial force of said plunger varies in accordance with the supplied electric current and does not vary in accordance with the displacement of said plunger, and
   a control apparatus for supplying the electric current to said solenoid, the electric current decreasing with an increase in car speed.

2. A power steering system as claimed in claim 1, wherein an in-port side orifice is provided either in the inlet or in the vicinity thereof of said control oil path branched from said high pressure oil path.

3. A power steering system as claimed in claim 1, wherein said return side orifice is provided in the cylinder section of said reaction piston downstream of said pressure control valve.

4. A power steering system as claimed in claim 1, wherein a differential pressure section is provided on the downstream side of and close to the control land of said pressure control valve.

5. A power steering system as claimed in claim 1, wherein an in-port filter is provided in the inlet of said control oil path branched from said high pressure oil path.

6. A power steering system as claimed in claim 1, wherein
   said pressure control valve and a valve housing for supporting said pressure control valve are made of abrasion resisting material, and
   said pressure control valve is slidably fitted directly in the hole of said valve housing.

7. A power steering system as claimed in claim 1, wherein
   said input shaft, said torsion bar, said oil path switching valve, said reaction piston, said pressure control valve, said output shaft, a pinion disposed on said output shaft and said solenoid are provided on the side of the valve housing,
   a rack shaft engageable with said pinion is provided on the side of a pinion housing, and
   said valve housing and said pinion housing are assembled together detachably.

8. A power steering system as claimed in claim 1, wherein said return side orifice is provided in a valve housing downstream of said pressure control valve.

9. A power steering system comprising
   an input shaft coupled to a steering wheel,
   a torsion bar for transmitting rotation of said input shaft to an output shaft,
   a power cylinder coupled to said output shaft,
   an oil path switching valve for switching oil paths to said power cylinder in accordance with the difference of turning angle between said input shaft and said output shaft,
   a high pressure oil path for supplying working oil delivered from an oil pump to said power cylinder via said oil path switching valve,
   a low pressure oil path for returning the working oil from said power cylinder to an oil tank via said oil path switching valve,
   a reaction piston for exerting a restraining force between said input shaft and said output shaft to limit the difference of turning angle therebetween,
   a control oil path extending from the midway of said high pressure oil path to said reaction piston,
   a pressure control valve for controlling oil pressure in said control oil path extending to said reaction piston to a level not higher than a predetermined highest pressure, said pressure control vavlv having chambers formed within its valve housing at positions facing its either end, one of said chambers being communicated with said low pressure oil path, said chambers being mutually connected via a drain oil path provided within said pressure control valve, said pressure control valve having an annular control groove and a differential pressure section provided on its outer peripheral surface, and said control groove and said differential pressure section being mutually communicated via an oil path provided within said pressure control valve,
   a return side orifice for communicating said control oil path between said pressure control valve and said reaction piston with said low pressure oil path, and
   a solenoid for actuating said pressure control valve by means of its plunger for generating an axial force which varies in accordance with a car speed and takes substantially a certain strength at every given car speed.

10. A power steering system comprising an input shaft coupled to a steering wheel, a torsion bar for transmitting rotation of said input shaft to an output shaft, a power cylinder coupled to said output shaft, an oil path switching valve for switching oil paths to said power cylinder in accordance with the difference of turning angle between said input shaft and said output shaft, a high pressure oil path for supplying working oil delivered from an oil pump to said power cylinder via said oil path switching valve, a low pressure oil path for returning the working oil from said power cylinder to an oil tank via said oil path switching valve, a reaction piston for exerting a restraining force between said input shaft and said output shaft to limit the difference of turning angle therebetween, a control oil path extending from the midway of said high pressure oil path to said reaction piston, a pressure control valve for controlling oil pressure in said control oil path extending to said reaction piston to a level not higher than a predetermined highest pressure, said pressure control valve having a chamfer provided on the whole periphery of its control land for causing the working oil to flow smoothly from the in-port side of said control oil path into a control groove provided on the outer peripheral surface of said pressure control valve, a return side orifice for communicating said control oil path between said pressure control valve and said reaction piston with said low pressure oil path, and a solenoid for actuating said pressure control valve by means of its plunger for generating an axial force which varies in accordance with a car speed and takes substantially a certain strength at every given car speed.

* * * * *